United States Patent Office 2,820,795
Patented Jan. 21, 1958

2,820,795

5-SULFONYLIMINO-4-SUBSTITUTED-$\Delta^2$-1,3,4-THIADIAZOLINE-2-SULFONAMIDES

Richard William Young, Riverside, and Kathryn Helen Wood, Greenwich, Conn., assignors to American Cyanamid Company, New York, N. Y., a corporation of Maine No Drawing. Application August 13, 1956
Serial No. 603,843

12 Claims. (Cl. 260—306.8)

This invention relates to new organic compounds and more particularly is concerned with novel 5-sulfonylimino-4-substituted-$\Delta^2$-1,3,4-thiadiazoline-2-sulfonamides which may be represented by the following general formula:

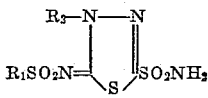

wherein $R_1$ is a phenyl, tolyl, p-acetylaminophenyl, p-bromophenyl, 3,4-dichlorophenyl or p-nitrophenyl radical, and $R_2$ is a lower alkyl radical, a monocyclic aryl radical or a monocyclic aralkyl radical. Suitable lower alkyl substituents are methyl, ethyl, propyl, isopropyl, butyl, pentyl, amyl, hexyl, etc.; suitable aralkyl substituents are benzyl, phenethyl, phenylpropyl, phenylbutyl, etc.; and suitable aryl substituents are phenyl and substituted phenyl, suitable substituents on the phenyl ring being —Cl, —Br, —I, —NO$_2$, —OCH$_3$ and lower alkyl radicals containing from 1 to 4 carbon atoms.

The compounds of this invention are excellent natriuretic agents, that is agents which enhance the excretion of sodium in the urine without necessarily changing the normal volume of urine excreted. The compounds may be administered orally and have been found to be effective in dosages of from 5 mg. to 100 mg. per kilogram of body weight.

The novel compounds may be prepared by reacting a suitable aryl sulfonyl chloride with a 5-imino-4-substituted $\Delta^2$-1,3,4-thiadiazoline-2-sulfonamide. Suitable aryl sulfonyl chlorides are p-toluenesulfonyl chloride, benzenesulfonyl chloride, p-acetylamino-benzenesulfonyl chloride, p-bromobenzenesulfonyl chloride, p-chlorobenzenesulfonyl chloride, 3,4-dichlorobenzenesulfonyl chloride, p-nitrobenzenesulfonyl chloride, etc. The reaction is preferably carried out in the presence of a basic organic solvent such as pyridine, lutidine, quinoline, dimethylaniline, etc. at a temperature ranging from 0° to 100° C.

The 5-imino-4-substituted-$\Delta^2$-1,3,4-thiadiazoline-2-sulfonamides, which are used as starting materials for the preparation of the novel compounds herein, are preferably prepared by the acid hydrolysis of 5-acylimino-4-substituted-$\Delta^2$-1,3,4-thiadiazoline-2-sulfonamides which are more particularly described and claimed in the co-pending application of Young, Wood and Vaughan, Serial No. 492,297, filed March 4, 1955, now Patent No. 2,783,241, and in the copending application of Young and Muller, Serial No. 560,866, filed January 23, 1956, now Patent No. 2,783,239.

The process by which the novel compounds of this invention may be prepared is illustrated schematically below using 5-imino-4-methyl-$\Delta^2$-1,3,4-thiadiazoline-2-sulfonamide as an example of a suitable 5-imino-4-substituted compound and using p-toluenesulfonyl chloride as an example of a suitable aryl sulfonyl chloride.

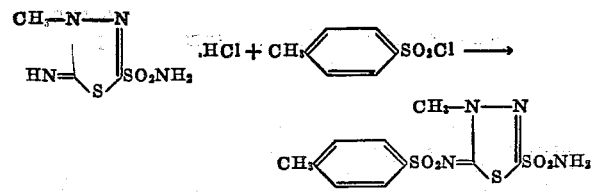

The invention will be described in greater detail in conjunction with the following specific examples in which the parts are by weight unless otherwise specified.

Example 1

1.91 parts of p-toluenesulfonyl chloride are added to a slurry of 2.31 parts of 5-imino-4-methyl-$\Delta^2$-1,3,4-thiadiazoline-2-sulfonamide hydrochloride in 23 parts of pyridine and after a 60-minute heating period, only a slight amount of insoluble material remains. Dilution with 150 parts of ice water and acidification of the cloudy mixture with sulfuric acid results in the formation of 2.38 parts (68%) of crude product, M. P. 205–208°. Reprecipitation of this solid from dilute sodium hydroxide with concentrated hydrochloric acid yields 1.75 parts M. P. 207–211°. This is recrystallized from absolute alcohol to give 0.67 part (19%) M. P. 210.5–212.5° of an analytically pure sample of 5-p-toluenesulfonylimino-4-methyl-$\Delta^2$-1,3,4-thiadiazoline-2-sulfonamide. A second fraction of 0.56 part (16%) is also obtained, M. P. 207–212.5°.

Exmaple 2

The addition of 8.8 parts of benzenesulfonyl chloride to a slurry of 10.5 parts of 5-imino-4-methyl-$\Delta^2$-1,3,4-thiadiazoline-2-sulfonamide hydrochloride in 105 parts of pyridine is followed by an hour of heating. Pouring the hot solution into 300 parts of ice-water results in the formation of 8.06 parts (49%), M. P. 165–166° of solid. Two recrystallizations from absolute alcohol gives 4.52 parts (27%), M. P. 194.5–196.5°, of analytically pure 5-benzenesulfonylimino - 4 - methyl-$\Delta^2$-1,3,4-thiadiazoline-2-sulfonamide. Two other fractions are also isolated by recrystallization, one 1.43 parts, M. P. 193–195°, and the other 0.60 part, M. P. 195–197°, making the total yield 36%.

Example 3

The procedure of Example 1 is followed reacting equivalent quantities of p-toluenesulfonyl chloride with 5-imino-4-benzyl-$\Delta^2$-1,3,4-thiadiazoline-2-sulfonamide in reagent pyridine. 5-p-toluenesulfonylimino-4-benzyl-$\Delta^2$-1,3,4-thiadiazoline-2-sulfonamide is obtained.

Example 4

The procedure of the preceding example is repeated except that p-bromobenzenesulfonyl chloride is used. 5-p-bromobenzenesulfonylimino-4-benzyl - $\Delta^2$ - 1,3,4 - thiadiazoline-2-sulfonamide is produced.

Example 5

Following the procedure of Example 1, 3,4-dichlorobenzenesulfonyl chloride is reacted with 5-imino-4-phenyl-$\Delta^2$-1,3,4-thiadiazoline-2-sulfonamide in reagent pyridine. 5 - (3,4 - dichlorobenzenesulfonylimino) - 4 - phenyl-$\Delta^2$-1,3,4-thiadiazoline-2-sulfonamide is produced.

Example 6

The procedure of the preceding example is followed except that 5-imino - 4 - (p-chlorophenyl)-$\Delta^2$-1,3,4-thiadiazoline-2-sulfonamide is used. 5-(3,4-dichlorobenzenesulfonylimino) - 4 - (p-chlorophenyl) - Δ² - 1,3,4 - thiadiazoline-2-sulfonamide is obtained.

Example 7

The procedure of Example 2 is followed except that 5-imino-4-(m-tolyl)-Δ²-1,3,4-thiadiazoline - 2 - sulfonamide is reacted with p-acetamidobenzenesulfonyl chloride in reagent pyridine. 5 - p-acetamidobenzenesulfonylamino-4-(m-tolyl)-Δ²-1,3,4-thiadiazoline-2-sulfonamide is prepared.

Example 8

Following the procedure of Example 1, p-nitrobenzenesulfonyl chloride is reacted with 5-imino-4-(p-acetamidophenyl)-Δ²-1,3,4-thiadiazoline-2-sulfonamide in dimethylaniline. 5-p-nitrobenzenesulfonylimino-4-(p-acetamidophenyl)-Δ²-1,3,4-thiadiazoline-2-sulfonamide is produced.

Example 9

The procedure of Example 2 is repeated with the exception that equivalent quantities of 5-imino-4-(m-methoxyphenyl)-Δ²-1,3,4-thiadiazoline-2-sulfonamide is used. 5 - benzenesulfonylimino - 4 - (m-methoxyphenyl) - Δ²-1,3,4-thiadiazoline-2-sulfonamide is obtained.

We claim:

1. 5 - sulfonylimino-4-substituted-Δ²-1,3,4-thiadiazoline-2-sulfonamides of the formula:

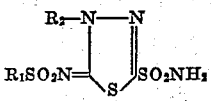

wherein $R_1$ is a member selected from the group consisting of phenyl, tolyl, p-acetylaminophenyl, p-bromophenyl, p-chlorophenyl, 3,4-dichlorophenyl, and p-nitrophenyl radicals and $R_2$ is a member selected from the group consisting of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals.

2. 5-p-toluenesulfonylimino-4-methyl - Δ² - 1,3,4 - thiadiazoline-2-sulfonamide.

3. 5-benzenesulfonylimino-4-methyl - Δ² - 1,3,4 - thiadiazoline-2-sulfonamide.

4. 5-p-bromobenzenesulfonylimino-4-benzyl - Δ² - 1,3,4-thiadiazoline-2-sulfonamide.

5. 5-(3,4 - dichlorobenzenesulfonylimino)-4-phenyl-Δ²-1,3,4-thiadiazoline-2-sulfonamide.

6. 5 - (3,4 - dichlorobenzenesulfonylimino) - 4 - (p-chlorophenyl)-Δ²-1,3,4-thiadiazoline-2-sulfonamide.

7. The method of preparing 5-sulfonylimino - 4 - substituted-Δ²-1,3,4 - thiadiazoline - 2 - sulfonamides of the formula:

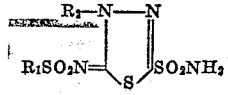

wherein $R_1$ is a member selected from the group consisting of phenyl, tolyl, p-acetylaminophenyl, p-bromophenyl, p-chlorophenyl, 3,4-dichlorophenyl, and p-nitrophenyl radicals and $R_2$ is a member selected from the group consisting of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals which comprises reacting a 5-imino-4-substituted-Δ²-1,3,4-thiadiazoline-2-sulfonamide of the formula:

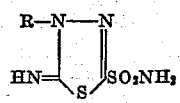

wherein R has the same meaning as $R_2$ above, with a corresponding aryl sulfonyl chloride in the presence of a basic organic solvent.

8. The method of preparing 5-p-toluenesulfonylimino-4-methyl-Δ²-1,3,4-thiadiazoline-2-sulfonamide which comprises reacting 5-imino-4-methyl-Δ²-1,3,4-thiadiazoline-2-sulfonamide with p-toluenesulfonyl chloride in the presence of a basic organic solvent.

9. The method of preparing 5-benzenesulfonylimino-4-methyl-Δ²-1,3,4-thiadiazoline-2-sulfonamide which comprises reacting 5-imino-4-methyl-Δ²-1,3,4-thiadiazoline-2-sulfonamide with benzenesulfonyl chloride in the presence of a basic organic solvent.

10. The method of preparing 5-p-bromobenzenesulfonylimino-4-benzyl - Δ² - 1,3,4 - thiadiazoline-2-sulfonamide which comprises reacting 5-imino-4-benzyl-Δ²-1,3,4-thiadiazoline-2-sulfonamide with p-bromobenzenesulfonyl chloride in the presence of a basic organic solvent.

11. The method of preparing 5-(3,4-dichlorobenzenesulfonylimino) - 4 - phenyl-Δ²-1,3,4-thiadiazoline-2-sulfonamide which comprises reacting 5-imino-4-phenyl-Δ²-1,3,4-thiadiazoline-2-sulfonamide with 3,4-dichlorobenzenesulfonyl chloride in the presence of a basic organic solvent.

12. The method of preparing 5-(3,4-dichlorobenzenesulfonylimino) - 4 - (p-chlorophenyl) - Δ² - 1,3,4 - thiadiazoline-2-sulfonamide which comprises reacting 5-imino-4 - (p-chlorophenyl)-Δ²-1,3,4-thiadiazoline-2-sulfonamide with 3,4-dichlorobenzenesulfonyl chloride in the presence of a basic organic solvent.

No references cited.